United States Patent [19]

Knoll

[11] Patent Number: 5,629,690
[45] Date of Patent: May 13, 1997

[54] SYSTEM AND METHOD OF INSTALLATION FOR LOCATING A HIDDEN SENSOR EXTERNALLY ACTIVE ON A MOTOR VEHICLE

[75] Inventor: Peter Knoll, Ettlingen, Germany

[73] Assignee: Robert Bosch GmbH, Stuttgart, Germany

[21] Appl. No.: 394,576

[22] Filed: Feb. 27, 1995

[30] Foreign Application Priority Data

Mar. 29, 1994 [DE] Germany .................... 44 10 895.8

[51] Int. Cl.$^6$ .................................................. G08G 1/00
[52] U.S. Cl. ...................................... 340/904; 340/435
[58] Field of Search .................................. 340/435, 904, 340/905, 901, 436

[56] References Cited

U.S. PATENT DOCUMENTS

| | | | |
|---|---|---|---|
| 4,636,997 | 1/1987 | Toyama et al. | 340/904 |
| 4,766,421 | 8/1988 | Beggs et al. | 340/904 |
| 4,891,624 | 1/1990 | Ishikawa et al. | 340/436 |
| 4,994,800 | 2/1991 | Milliken | 340/904 |
| 5,394,292 | 2/1995 | Hayashida | 340/435 |

*Primary Examiner*—Jeffery Hofsass
*Assistant Examiner*—Timothy Edwards, Jr.
*Attorney, Agent, or Firm*—Frishauf, Holtz, Goodman, Langer & Chick, P.C.

[57] ABSTRACT

To hide, and protect a transducer (2), such as an ultrasonic, infrared transducer or the like, located on an outer surface part (1) of a vehicle, for example within a recess in a bumper, from vandalism or other damage, the transducer is located on the outer surface part (1) to be flush with the outer surface thereof, and a cover (4) is located on said outer surface part. The outer surface part (1), as is customary has a predetermined surface shape or contour, and the outer surface cover (4) matches and engages that predetermined outer surface part of contour. Preferably, the transducer is an ultrasonic transducer terminating in a membrane (3) which is located flush with the outer surface of the outer surface part (1), and acoustically coupled, for example by an adhesive (5), with the outer cover (4) to reduce damping of signals from the transducer, and of echo signals from an object received by the transducer, and passing through the outer cover. The material of the cover is preferably so selected that it has sufficient hardness and stiffness for good matching with the transducer. The method and system is suitable for combination with a parking assistance system (10, 11). The cover location of the transducer (2) prevents visual identification of the transducer, so that there is no interference with the visual aspect of the vehicle, and damage to the transducer, inadvertently or by vandalism, is effectively eliminated.

12 Claims, 1 Drawing Sheet

SYSTEM AND METHOD OF INSTALLATION FOR LOCATING A HIDDEN SENSOR EXTERNALLY ACTIVE ON A MOTOR VEHICLE

BACKGROUND

The present invention relates to a system to protect an object detection transceiver, or a transducer or sensor, for example operating as an ultrasonic sensor, an optical sensor, or an electromagnetic wave energy sensor, located on an external portion of a motor vehicle used, for example, as an assistance to park the vehicle.

BACKGROUND

Various types of sensors, particularly ultrasonic sensors, are associated with motor vehicles, typically passenger cars, in which ultrasonic signals are emitted, reflected from impediments or other objects, and received as echoes from the object. They are usually located in or on one of the bumpers of the vehicle. The vehicle bumper is formed with a bore, into which an ultrasonic transmitter/receiver or transducer is located. It is so aligned that reflections from the road surface on which the car operates do not interfere with operation of the sensor, that is, detection of objects located above the road surface. The opening or bore in the bumper frequently is visually undesirable. Further, third parties, for example children playing, can damage the transducer, possibly impairing its operating reliability.

THE INVENTION

It is an object to provide a method for installing a transducer for signals in a motor vehicle, and a system of a motor vehicle—transducer combination such that the sensor or transducer is not recognizable when secured to the motor vehicle and additionally protecting the sensor against intentional or unintentional damage.

Briefly, the transducer or sensor is mounted on an outer surface part of a vehicle, in which the outer surface part has a predetermined surface shape or contour. The sensor is mounted such that its outer surface, formed by a membrane, is flush, or even with the outer surface of this part. A cover is then placed about the vehicle part which, at least in the region in which the sensor is located, covers the sensor or transducer. The cover is shaped to match and fit over the surface shape or contour of the part, so that it, itself, defines the visual aspect of the automotive part, typically the bumper, or at least that part thereof in which the sensor or transducer is located.

The method of installing the sensor such that its outer surface is flush or even with the vehicle part, typically a bumper, and the system in which the sensor is located on the bumper, but covered from the outside, has the advantage that the cover which, preferably, is fitted over the entire bumper, renders the presence of the sensor essentially invisible; the contour or outline of the sensor, likewise, becomes invisible. As a result, an observer will merely see a uniform, continuous view of the bumper, since the covered arrangement of the transducer does not call attention to the transducer as such, so that it is effectively protected against damage or vandalism.

The method and system of the invention permits placing the transducer in various locations on the vehicle. For example, it can be located on a bumper, or on one of the mud guards or fenders, or on a vehicle panel. The vehicle designer, thus, can have a wide choice of locations for the transducer in dependence on the particular shape of the vehicle part where it is to be located; likewise, the engineer responsible for selecting the most desirable place, from a radiation and reception point of view, can locate the transducer in the most effective place, without regard to aesthetic considerations, which might, otherwise, cause conflicts with the vehicle appearance designer.

The cover, preferably, is made of plastic material or a sturdy foil. Such covers are preferred since they can be easily shaped to fit the contour of the particular vehicle part where the transducer is located. To ensure operating reliability, for example if the transducer/sensor is an ultrasonic transducer, it is desirable to so select the stiffness, or hardness, respectively, of the cover that the ultrasonic signals transduced by the transducer are damped as little as possible. This, then, results in efficient signal transfer through the cover, and utilization of energy in the transducer system and ensuring sufficient sensitivity to echo signals.

Other types of transducers and sensor may be used, for example optical sensors, capacitative sensors, or sensors or transducers emitting, and being responsive to, electromagnetic radiation. It is only necessary to so select the cover that the particular signals used in the system are effectively passed through the cover. If an infrared sensor, for example, is used, the cover should be selected to be transparent to infrared light, but opaque with respect to light in the normal visible range. If an electromagnetic or capacitative sensor is used, a cover material is suitable which does not essentially interfere with spreading of the electrical or electromagnetic field.

If the cover is an ultrasonic sensor, it is desirable to acoustically couple the transducer membrane with the cover, e.g. by an adhesive, thereby ensuring good efficiency of operation of the transducer and of the sensor. The sensor, although not visible from the outside, will however emit signals which are highly damped by the cover.

DRAWINGS

FIG. 1 is a pictorial, highly schematic view of a transducer located in the bumper of an automotive vehicle; and FIG. 2 is a schematic diagram of a parking-assistance system utilizing two transducers, installed as illustrated in FIG. 1.

DETAILED DESCRIPTION

Figure 1:
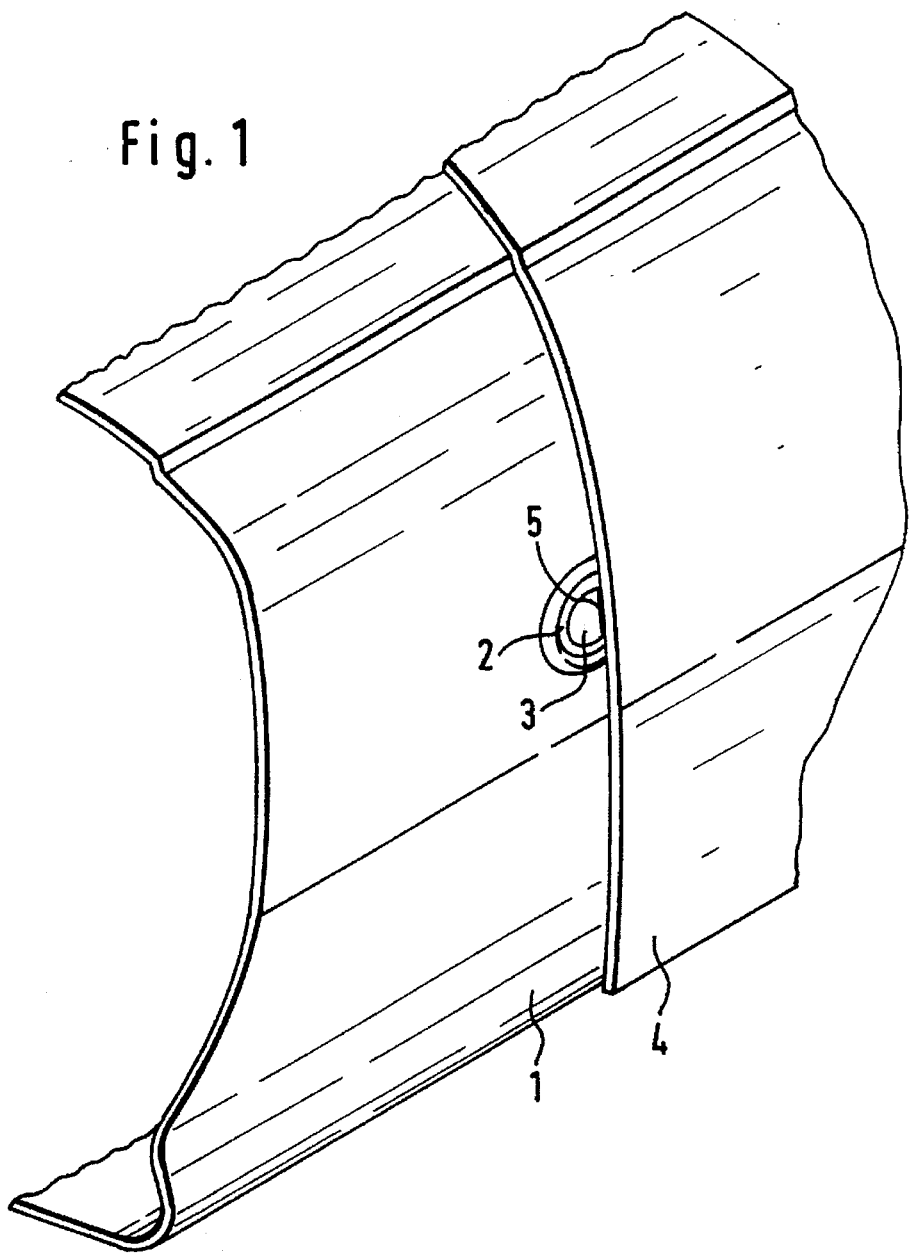

An external part 1 of a vehicle is illustrated, in fragmentary form, in FIG. 1. The particular part illustrated is a portion of a bumper, which has a predetermined shape, profile, or contour. This shape or contour is interrupted by one or more bores or recesses. A transducer 2 is located in a respective recess. The transducer 2, typically, has circular cross section. If the transducer is an ultrasonic transducer, it terminates in a flat membrane 3.

In accordance with a feature of the invention, a cover 4, for example of plastic material, or a foil of plastic material, or some other suitable material, is located on the bumper 1. The membrane 3, preferably, is so installed in the bumper 1 that its surface will be flush with the outer surface of the bumper 1. The cover 4 is so constructed that its inner surface is in contact with the membrane 3 of the transducer 2. Most desirably, the cover 4 is in engagement with the entire surface of the membrane 3, so that oscillations of the membrane 3 are transferred to the cover 4, and vice versa. Thus, upon reception of echo signals, oscillations of the cover 4 are then transferred back to the membrane 3. To improve the acoustic coupling between the membrane 3 and the cover 4, a coupling medium, for example an adhesive 5, can be applied between the membrane 3 and the cover 4. Other signal transmitting substances may be used.

The cover 4, preferably, is made of plastic material which has a sufficient stiffness, that is, Shore-hardness, to provide for good coupling with membrane 3, and good transfer of oscillatory energy between the membrane 3 and the cover 4.

Figure 2:
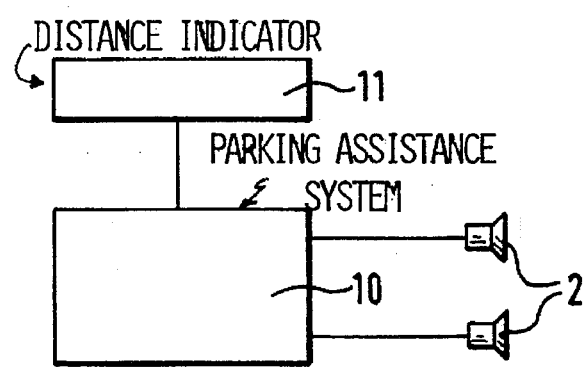

Distance measurement systems, which provide distance indications from a fixed object, for example an already parked vehicle, are frequently used as parking assistance for cars, especially passenger cars. Parking assistance systems usually use ultrasonic transducers. FIG. 2 illustrates a parking assistance system 10, coupled to two ultrasonic transducers 2. The ultrasonic transducers, preferably, are located on a bumper 1. Other parts of the vehicle can be selected for their location, as determined by the structure of the vehicle and the external appearance of its body. The parking assistance system 10 is coupled to an indicator or display 11 which provides optical or acoustic signals to the vehicle operator. Both the parking assistance system 10 as well as the distance indicator 11 are well known, and any suitable system and indicator may be used.

Other types of transducers than ultrasonic transducers may be used. Thus, the transducers 2 can be optical transducers, such as infrared transducers; or capacitative transducers, or electromagnetic transducers. The cover 4 then must be selected to be suitably transparent to the radiation radiated from, and received by the transducers 2, and so constructed and made of such materials that the signals from the transducer 2, and received by the transducer 2, are interfered with, or damped as little as possible. Thus, if optical systems are used, the cover 4 must be transparent to the wave length used by the transducer 2. If the transducer 2 is an ultrasonic transducer, the cover 4, preferably, is made of a material, the hardness of which is matched to the characteristics of the transducer 2. Both the characteristics of the material of the cover 4, as well as its thickness and the particular shape, as illustrated in FIG. 4 slightly outwardly bulged, should be so selected that good matching to the characteristics of the transducer 2 can be obtained.

If the transducer 2 is an ultrasonic transducer installed in a bumper 1 made of steel, a suitable material for the cover 4 is PU (polyurethane), having a thickness of about 0.2–0.5 mm. A suitable material 5 to couple the cover 4 to the membrane 3 of such a transducer is acrylate or synthetic rubber. If the transducer 2 is an infrared transducer, a suitable material for the cover 4 is PMMA (Polymethylmethaacrylat) having a thickness of about 0.5–3 mm. A suitable material 5 to couple the transducer to the cover 4 is cyanoacrylate or any infrared transmissive glue.

I claim:

1. A method of transducing signals from a motor vehicle, comprising the steps of securely mounting a transducer (2) having an outer membrane (3) on an outer surface part (1) of the vehicle, with the outer surface of the membrane (3) being flush, or even with the outer surface of said outer surface part, wherein the outer surface part has a predetermined surface shape or contour; and covering said outer surface part (1) including the region where the transducer is located, with a cover (4) which is shaped to match, and fit over, the surface shape or contour of the outer surface part (1) and visually covering and hiding the transducer to render said transducer essentially invisible.

2. The method of claim 1, wherein the transducer (2) comprises one of: an optical transducer, a capacitative transducer, an electromagnetic transducer.

3. The method of claim 2, wherein said step of covering the outer surface part comprises covering said outer surface part with a cover (4) which is at least one of: optically transparent, transparent to infrared light, and transparent to electromagnetic wave radiation.

4. The method of claim 1, wherein the covering step comprises covering the transducer with a plastic cover or sturdy foil, wherein the plastic cover or sturdy foil has a predetermined hardness or stiffness, which hardness or stiffness is characterized by minimum damping of signals transduced by the transducer (2).

5. The method of claim 1, wherein said covering step comprises operatively, acoustically coupling the membrane (3) to said cover (4).

6. The method of claim 1, further including the step of evaluating an echo signal transduced by said transducer; and providing an output signal representative of said echo signal if the echo signal indicates that an echo is received from an object located within a predetermined distance from said outer surface part (1).

7. A system for transducing signals from a motor vehicle, wherein the motor vehicle includes an outer surface part (1) which has a predetermined surface shape or contour;

a recess or bore formed in said outer surface part;

an ultrasonic transducer (2) having a transducer membrane (3) at an outer side thereof, located within said recess or bore and mounted such that the outer surface of the membrane (3) is flush, or even with the outer surface of said outer surface part (1); and a cover (4) covering said outer surface part (1) including the region of the ultrasonic transducer, and engaged with and about the outer surface part (1) and visually covering and hiding the transducer to render said transducer essentially invisible.

8. The system of claim 7, wherein said outer surface part comprises a bumper of the vehicle.

9. The system of claim 7, wherein the material of the cover (4) has a hardness or stiffness which is matched to the oscillation frequency of the transducer (2) for minimum damping of signals transduced by the transducer.

10. The system of claim 7, wherein the transducer membrane (3) and the cover (4) are tightly acoustically coupled.

11. The system of claim 7, including coupling means (5), optionally an adhesive, between the membrane (3) of the transducer (2) and the cover (4).

12. The system of claim 7, in combination with a parking assistance system (10) having an output indication (11) providing an output if the transducer transduces echo signals received from an object located spaced from the vehicle below a predetermined distance.

* * * * *